United States Patent
Huston, III

(10) Patent No.: US 9,749,340 B2
(45) Date of Patent: Aug. 29, 2017

(54) SYSTEM AND METHOD TO DETECT AND MITIGATE TCP WINDOW ATTACKS

(71) Applicant: Arbor Networks, Inc., Burlington, MA (US)

(72) Inventor: Lawrence B. Huston, III, Ann Arbor, MI (US)

(73) Assignee: Arbor Networks, Inc., Burlington, MA (US)

(*) Notice: Subject to any disclaimer, the term of this patent is extended or adjusted under 35 U.S.C. 154(b) by 227 days.

(21) Appl. No.: 14/698,316

(22) Filed: Apr. 28, 2015

(65) Prior Publication Data

US 2016/0323299 A1 Nov. 3, 2016

(51) Int. Cl.
*H04L 29/06* (2006.01)

(52) U.S. Cl.
CPC ...... *H04L 63/1416* (2013.01); *H04L 63/1466* (2013.01)

(58) Field of Classification Search
CPC .............. H04L 63/1416; H04L 63/1466
USPC ......................................................... 726/23
See application file for complete search history.

(56) References Cited

U.S. PATENT DOCUMENTS

| 2003/0061513 A1* | 3/2003 | Tsafnat | H04L 63/1458 726/23 |
| 2003/0110274 A1* | 6/2003 | Pazi | H04L 63/08 709/229 |
| 2008/0016566 A1* | 1/2008 | Raz | H04L 63/1458 726/22 |
| 2014/0101306 A1* | 4/2014 | Murgia | H04L 47/125 709/224 |

* cited by examiner

*Primary Examiner* — Kambiz Zand
*Assistant Examiner* — Benjamin Kaplan
(74) *Attorney, Agent, or Firm* — Locke Lord LLP; Scott D. Wofsky; Christopher J. Capelli

(57) ABSTRACT

A computer system and method for monitoring traffic for determining denial of service attacks in a network. Data packets are monitored which are attempting to access one or more server devices in a protected network. A Transport Control Protocol (TCP) window advertisement value is determined for the data packets. If a detected TCP window advertisement value for monitored packets is determined less than a TCP window advertisement threshold value then a determination is made as to whether the data rate for the packets is less than a data rate threshold value. The monitored packets are determined malicious if the detected window advertisement value is less than the TCP window advertisement threshold value and the determined data rate is less than the data rate threshold value.

18 Claims, 2 Drawing Sheets

SYSTEM AND METHOD TO DETECT AND MITIGATE TCP WINDOW ATTACKS

FIELD OF THE INVENTION

The present invention relates to protecting networks, and more particularly, to protecting networks against TCP window attacks.

BACKGROUND OF THE INVENTION

As businesses become increasingly dependent on computerized communications, businesses concurrently become increasingly vulnerable to attacks on the underlying computer infrastructure. The growing problems associated with security exploits within the architecture of the Internet are of significant concern to network providers. For instance, networks, and network devices are increasingly affected by the damages caused by Denial of Service ("DoS") attacks.

A DoS attack is defined as an action taken upon on a computer network or system by an offensive external device that prevents any part of the network from functioning in accordance with its intended purpose. This attack may cause a loss of service to the users of the network and its network devices. For example, the loss of network services may be achieved by flooding the system to prevent the normal servicing for performing legitimate requests. The flooding may consume all of the available bandwidth of the targeted network or it may exhaust the computational resources of the targeted system.

A Distributed Denial of Service ("DDoS") attack is a more aggressive action that involves multiple offensive devices performing an attack on a single target computer network or system. This attack may be performed in a coordinated manner by these multiple external devices to attack a specific resource of a service provider network. The targeted resource can be any networking device such as routers, Internet servers, electronic mail servers, Domain Name System ("DNS") servers, etc. Examples of a DDoS attack include (but are not limited to): large quantities of raw traffic designed to overwhelm a resource or infrastructure; application specific traffic designed to overwhelm a particular service; traffic formatted to disrupt a host from normal processing; traffic reflected and/or amplified through legitimate hosts; traffic originating from compromised sources or from spoofed IP addresses; and pulsed attacks (which start/stop attacks). Further, it is to be understood DDoS attacks are typically categorized as: TCP Stack Flood Attacks (e.g., flood a certain aspect of a TCP connection process to keep the host from being able to respond to legitimate connections (which may also be spoofed)); Generic Flood Attacks (e.g., consists of a flood of traffic for one or more protocols or ports, which may be designed to appear like normal traffic which may also be spoofed)); Fragmentation Attacks (e.g., consists of a flood of TCP or UDP fragments sent to a victim to overwhelm the victim's ability to re-assemble data streams, thus severely reducing performance); Application Attacks (e.g., attacks designed to overwhelm components of specific applications); Connection Attacks (e.g., attacks that maintain a large number of either ½ open TCP connections or fully open idle connections); and Vulnerability Exploit Attacks (e.g., attacks designed to exploit a vulnerability in a victim's operating system).

A specific type of DDoS attack are attacks that manipulate the TCP window advertisement size of data packets to consume excessive resources of a client/server device receiving and responding to the data packets sent from an external client. Essentially, in such an attack, the attacking external device opens a TCP connection to a server device and requests a large file (via HTTP or other protocol). Once the server device starts sending the requested data, the attacker will set the window size (via the TCP acknowledgement) to zero (0) (or another nominal value). This keeps the connection active but prevents the server from sending additional data. In most TCP implementations this results in the operating system of the server device buffering large amounts of data. Typically, the space for the data in the server device is normally fixed, so an attacker can exhaust the resources of the server device by opening multiple connections. The attacker can ensure the server device does not reclaim these resources by periodically sending acknowledgements with a zero (0) window size or by periodically allowing the server device to send a small amount of data (e.g., by opening the window a small amount). This results in the server device treating these connections as active and so as not to not close them. It is further noted that there are several variations of such TCP attacks where instead of sending an advertised window size of zero (0), the attacker client device does not acknowledge data sent by the server device or only acknowledges a small amount of the data sent by the server device to consume the resources of the server device.

Thus, the architecture of the Internet makes networks and network devices vulnerable to the growing problems of DDoS attacks. Therefore, the ability to avoid or mitigate the damages of a DDoS attack, such as a TCP window attack, while preventing blocking of valid hosts, is advantageous to devices located in a protected network.

SUMMARY OF THE INVENTION

The purpose and advantages of the below described illustrated embodiments will be set forth in and apparent from the description that follows. Additional advantages of the illustrated embodiments will be realized and attained by the devices, systems, and methods particularly pointed out in the written description and the claims herein, as well as from the drawings.

In accordance with a purpose of the illustrated embodiments, in one aspect described is a computer system and method for monitoring traffic for determining denial of service attacks in a network. Data packets are monitored which are attempting to access one or more devices (e.g., servers) in a protected network. A Transport Control Protocol (TCP) window advertisement value is determined for the data packets. If a detected TCP window advertisement value for monitored packets is determined less than a TCP window advertisement threshold value then a determination is made as to whether the data rate for the packets is less than a data rate threshold value. The monitored packets are determined malicious if the detected window advertisement value is less than the TCP window advertisement threshold value and the determined data rate is less than the data rate threshold value.

BRIEF DESCRIPTION OF THE DRAWINGS

So that those having ordinary skill in the art, to which the present embodiments pertain, will more readily understand how to employ the novel system and methods, certain illustrated embodiments thereof will be described in detail herein-below with reference to the drawings, wherein.

DETAILED DESCRIPTION OF CERTAIN EMBODIMENTS

Figure 1:
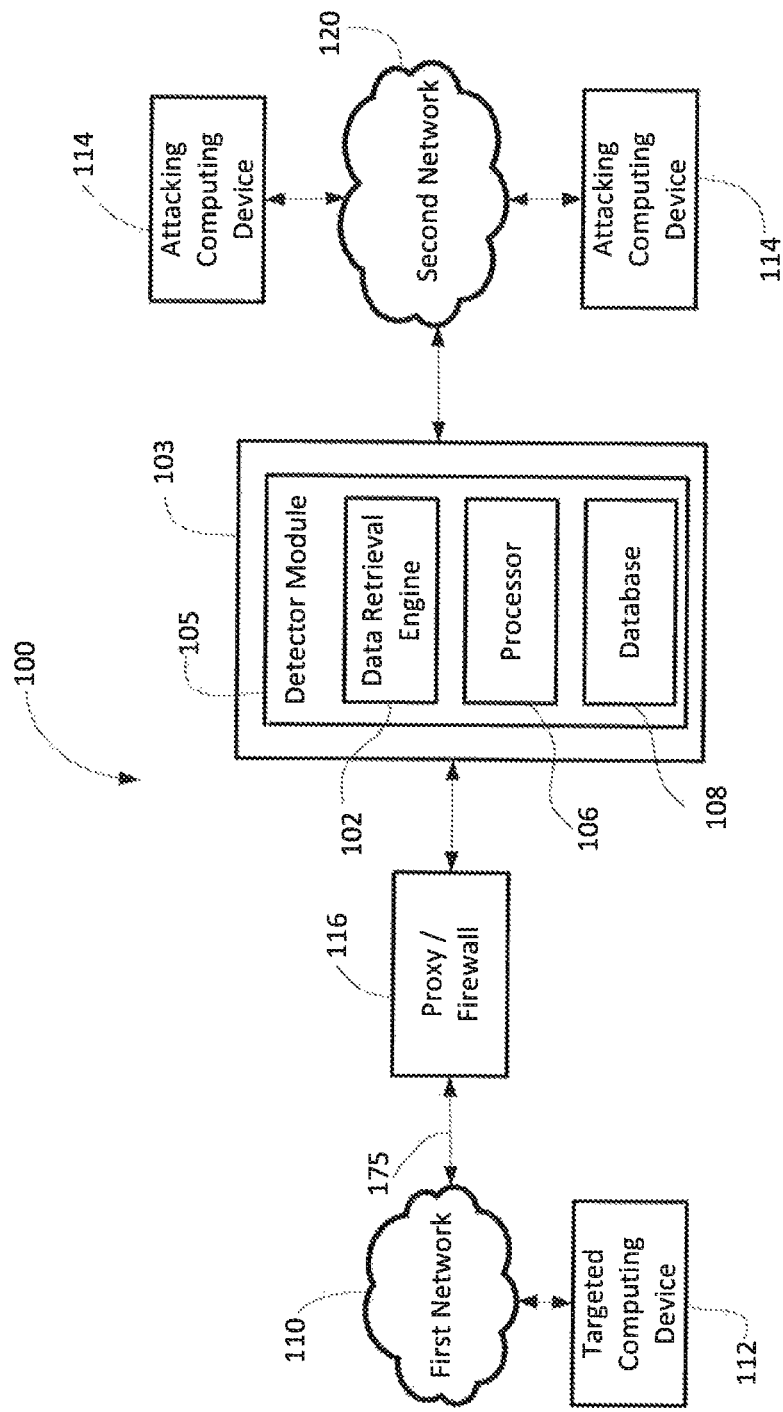
FIG. 1 illustrates a system diagram of an exemplary embodiment of a system for monitoring traffic flow in a network.

The below illustrated embodiments are directed to systems and methods for monitoring traffic flow and protecting devices in a network. It is to be appreciated the below illustrated embodiments are not limited in any way to what is shown, as the illustrated embodiments described below are merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the certain illustrated embodiments. Also, the flow charts and methods described herein do not imply either required steps or a required order to the steps, and it is contemplated herein that the illustrated embodiments and processes may be implemented in any order and/or combination that is practicable.

Unless defined otherwise, all technical and scientific terms used herein have the same meaning as commonly understood by one of ordinary skill in the art relating to the below illustrated embodiments. Although any methods and materials similar or equivalent to those described herein can also be used in the practice or testing of the below illustrated embodiments, exemplary methods and materials are now described.

It must be noted that as used herein and in the appended claims, the singular forms "a", "an," and "the" include plural referents unless the context clearly dictates otherwise. Thus, for example, reference to "a stimulus" may include a plurality of such stimuli and reference to "the signal" may include reference to one or more signals and equivalents thereof as known to those skilled in the art.

It is to be appreciated the certain embodiments described herein may be utilized in conjunction with a software algorithm, program or code residing on computer useable medium having control logic for enabling execution on a machine having a computer processor. The machine typically includes memory storage configured to provide output from execution of the computer algorithm or program. As used herein, the term "software" is meant to be synonymous with any code or program that can be executed by a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the certain embodiments described herein. Thus the certain embodiments are not to be understood to be limited by what has been particularly shown and described, except as indicated by the appended claims. As used herein, a "flow" is generally defined as a stream (unidirectional or bi-directional) of packets traveling between two points in a network that all have the same characteristics. Nevertheless, a flow may include only a single packet sent from one point to another point in a network.

The methods and systems described herein allow users to mitigate against a TCP Denial of Service type of attack. In one embodiment, the present invention infers when a targeted computing device (e.g., a server) is trying to send data to an attacking computing device (e.g., a client) and monitoring the rate the client is consuming this data (via a protective detector module). If this rate is below a defined threshold, then such a client device is determined malicious. To detect when the protected server is attempting to send data, the protective detector module monitors the TCP window advertisement of data packets sent from the client to the server. If the TCP window advertisement is smaller than a threshold value then the protective detector module determines the server is pushing data to the client and it is being throttled to create a denial of service attack. It is to be appreciated the detection method of the present invention can determine the window threshold value by tracking the window size sent during connection establishment. Alternatively, the window threshold value may be configured by a user to have a static threshold value.

It is to be appreciated and understood that in many network environments where the present invention is to be implemented, it is not feasible to monitor both sides (e.g., between an attacking client and a targeted server) of the TCP conversation (due to network topology or other routing issues). Thus, the present invention is specifically adapted to monitor the conversation between an attacking client and the protected network.

Referring to FIG. 1, a hardware diagram depicting an environment 100 in which the processes described herein can be executed is provided for exemplary purposes. In one embodiment, environment 100 includes detector module 105, networks 110 and 120, communication links 175, originating attacking computing devices 114, and a targeted computing device 112. In the illustrated embodiment, protective detector module 105 preferably runs on a monitoring computer 103. Monitoring computer 103 may be adapted to execute any operating system including UNIX, Windows or any other suitable operating system. In the exemplary illustrated embodiment, detector module 105 includes data retrieval engine 102, a processor 106 and a database 108. Data retrieval engine 102 may be configured to interact with database 108 responsive the method described herein.

An illustrated use of the detection module 150 described herein is with the Pravail™ Availability Protection System (Pravail™ APS) from Abor® Networks. Pravail™ APS is a network security product configured and adapted for generally preventing DDoS attacks and availability threats that affect data centers and enterprise networks. Pravail™ APS may be deployed by network/data center operators in front of services to stop application-layer attacks and disrupt botnet communications. Pravail™ APS may further be integrated upstream in a network/date center to preferably stop thwart volumetric DDoS attacks. Features of Pravail™ APS include (but are not limited to): detecting and blocking emerging application-layer DDoS attacks; deploy a turnkey solution to thwart DDoS threats; accelerate responses to DDoS attacks to prevent disruption of legitimate services; and prevent illegitimate botnet communications by leveraging real-time security intelligence.

In the embodiment illustrated in FIG. 1, targeted computing device 112 connected to the first network 110 represents a device and/or computer which is subject to attack by one or more attacking computing devices 114 connected to the second network 120. Data transfer is preferably monitored and controlled between the first network 110 and second network 120 by detector module 105. For ease of illustration only a single targeting device is shown 112, however it is to be appreciated the present invention involves the coupling of a plurality of targeted computing devices 112 to the first network 110, each computing device 112 typically includes servers, including (but limited to): networking device such as routers, Internet servers, electronic mail servers, Domain Name System ("DNS") servers and other similar computing devices having network (e.g., Internet) connectivity. For ease of description purposes, each targeted computing device 112 is hereinafter referred to simply as a "server device".

It is to be further understood the first network 110 is to be considered a "protected network" for each coupled protected server device 112 in view of the protective services provided by the protective detector module 105 described herein. FIG. 1 illustrates the relationship between the protected network 110, protective detector module 105, the second network 110 (such as private or a public computer network (e.g., the Internet)), and external host/client devices 114.

In a typical implementation, the external host/client devices 114 (also referred to as external devices or client devices) attempt to connect to protected devices 112 within a protected network 110. Examples of such a first network include (but are not limited to): an enterprise network, such as a school network, business network, and government network, to list a few examples.

Examples of external host/client devices 114 include servers, laptops, desktop computers, mobile computing devices, and other similar devices and systems having Internet connectivity. For ease of description purposes, each attacking computing device is hereinafter referred to simply as a "client device" 114.

As previously mentioned, in a preferred illustrated embodiment, the protected network 110 is protected by protective detector module 105 preferably via a network monitoring probe located between the second network 120 and the first protected network 110. In other embodiments, the protective detector module 105 is located within the Internet, service provider network or enterprise network rather than as a network edge as illustrated. It is to be appreciated that when deployed within the protected network 110, traffic is diverted to the computer system 103 of the protective detector module 105.

It is to be appreciated the illustrated embodiment of FIG. 1 may include a firewall-proxy combination device preferably positioned downstream in the data path from the detector module 105 (as shown), but it may be placed anywhere as would be recognized by those skilled in the art, including, for exemplary purposes only and without limitation. Additionally, a firewall-proxy combination device and detector module 105 may be functionally combined into a single operating piece of electronics.

Figure 2:
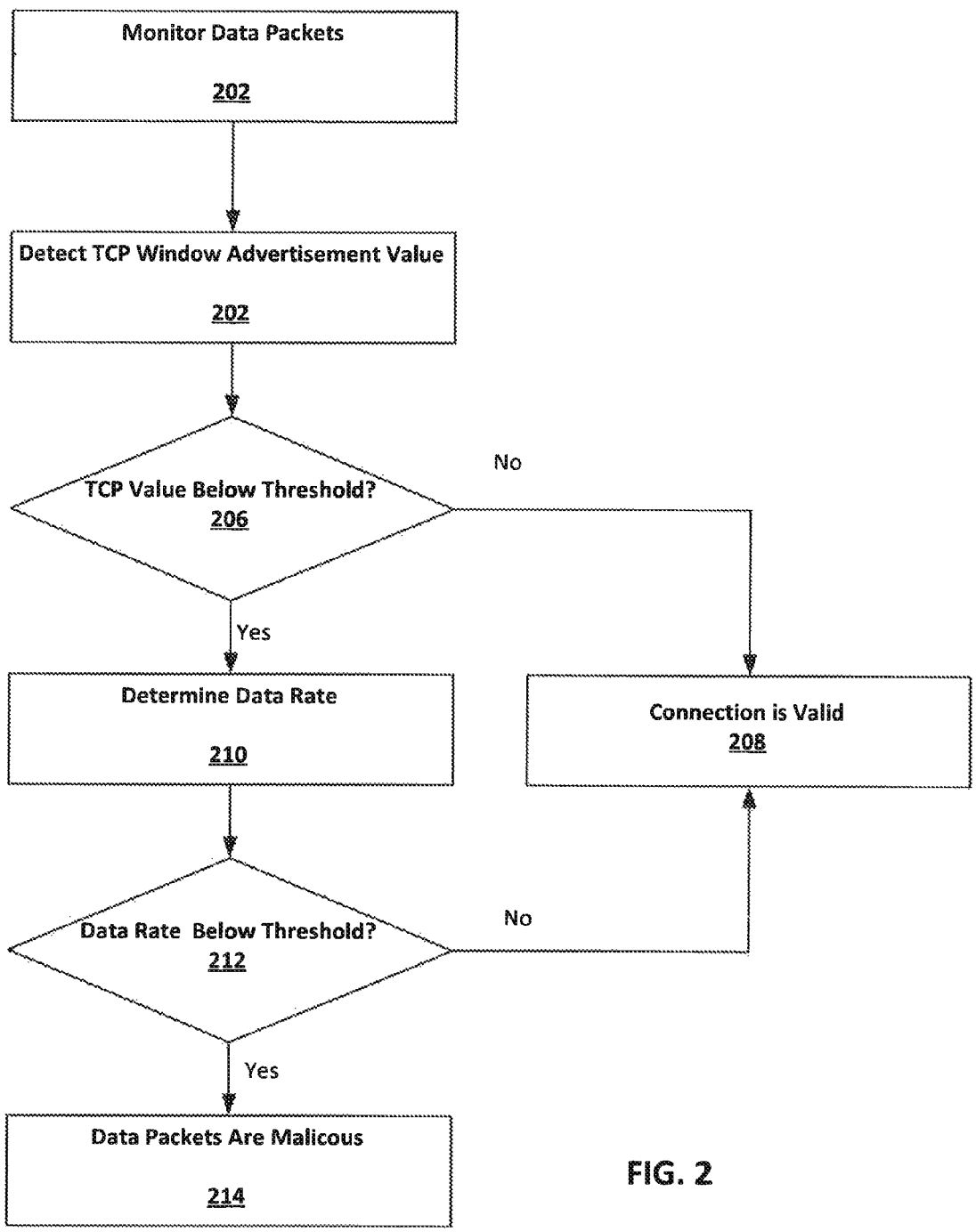
FIG. 2 is a flowchart of operational steps of the monitoring system of FIG. 1, in accordance with an illustrative embodiment of the present invention.

Turning to FIG. 2, illustrated therein is a flowchart of exemplary operational steps of protective detector module 105 of FIG. 1, in accordance with an illustrative embodiment of the present invention. Before turning to description of FIG. 2, it is noted that the flow diagram in FIG. 2 illustrates exemplary operational steps which are carried out in a particular order, as indicated by the lines connecting the blocks, but the various steps shown in this diagram may be performed in any order, or in any combination or sub-combination. It should be appreciated that in some embodiments, some of the steps described below may be combined into a single step. In some embodiments, one or more additional steps may be included.

It is contemplated that certain embodiments of detector module 105 described herein are capable to continually monitor network traffic flow over a wide range of operating conditions. Detector module 105 can also analyze the monitored data in real-time and provide an assessment of the performance of a particular node (i.e., targeted computing device 112) or an entire network (i.e., first network 110). Accordingly, at 202, detector module 105 monitors traffic/data packets sent from one or more attacking computer client devices 114 to one or more computer server devices 112 in the network data flow. In an embodiment of the present invention, detector module 105 analyzes the data packets in the network traffic to identify malicious network traffic.

At 204, detector module 105 analyzes each monitored data packet to determine the TCP Window Advertisement value associated with the client device 114 sending the data packet to an intended target server 112 in the protected network 110. As is known, each TCP data packet typically contains this 16-bit value (e.g., the Window Advertisement) that indicates how many octets it can receive at once. When IP packets are received, they are placed in a temporary area of RAM, such as a buffer, until the receiving computer (e.g., a client device 114) has the capability to process them; this value represents how big a buffer the receiving client 114 has made available for this temporary storage of IP packets.

At 206, detector module 105 determines if the aforesaid detected TCP Window Advertisement value for an aforesaid monitored data packet is less than a TCP Window Advertisement threshold value. In accordance with an illustrated embodiment, the TCP Window Advertisement threshold value is preferably determined by detector module 105, preferably via statistical analysis, by tracking the TCP window advertisement values during a packet data connection between an external client device 114 and a protected server device 112. Alternatively, the TCP window advertisement threshold value is a user configured static value stored (e.g., in database 108) in the detector module 105.

If the detected TCP Window Advertisement value for an aforesaid monitored data packet is greater than the TCP Window Advertisement threshold value, the client device 114 sending the data packet is not considered an attacking device and thus no countermeasures are performed thereupon, step 208. However, if the detected TCP Window Advertisement value for an aforesaid monitored data packet is less than the TCP Window Advertisement threshold value, then at 210, the server data rate for the server device 114 sending the data packet is determined preferably by detector module 105. In accordance with an illustrated embodiment, the data rate is preferably determined contingent upon statistical analysis regarding an amount of new data being acknowledged by TCP acknowledgement signals for the data packets sent from the external client device 114. It is to be appreciated the aforesaid data rate can be computed by one of many methods including (but not limited to) inverse token bucket techniques and windowed average techniques.

Once the aforesaid data rate is determined, then at 212, detector module 105 determines if the aforesaid determined data rate for a client device 114 sending the data packet is less than a data rate threshold value. In accordance with an illustrated embodiment, the data rate threshold value may be dynamically determined by the detector module 105, preferably based upon statistical analysis, of the network traffic flow or may be a user prescribed static value. If the determined data rate for an aforesaid monitored data packet is greater than the data rate threshold value, the client device 114 sending the data packet is not considered an attacking device and thus no countermeasures are performed thereupon, step 208.

If the determined data rate for an aforesaid monitored data packet is less than the data rate threshold value, then at 214, then the data packets are considered malicious and the client device 114 sending the data packets is considered an attacking device. Once a client device 114 is considered an attacking device (via the above process), detector module 105 is preferably configured to initiate enforcement actions against the client device 114, preferably via denial of service countermeasures. For instances, such countermeasures may include sending a TCP Reset Attack signal to the protected server device 112 in the protected network 110 that is targeted by the determined malicious packets to terminate the TCP connection to the external client device 114 sending the determined malicious packets. The countermeasures may further include blacklisting the external client device 114 sending the determined malicious packets for a predetermined time period.

In accordance with another illustrated embodiment, to mitigate against the occurrences of false positive malicious determinations, the detector module 105 is configured and adapted to determine data packets to be malicious if either the detected window advertisement value is less than the TCP window advertisement threshold value (step 206) and/or the determined data rate is less than the data rate threshold value (step 212) on at least a user configurable number of TCP connections from a client device 114 to a protected server device 112 before enforcement actions are initiated against the determined attacking client device 114.

In accordance with another illustrated embodiment, the detector module 105 is configured and adapted to determine if the detected TCP window advertisement value for data packets has exceeded the TCP window advertisement threshold value after a malicious determination has been made for a client device 114 transmitting such data packets. The detector module 105 may then reclassify the data packets as non-malicious, and thus terminate enforcement actions taken against the aforesaid client device 114 since the client device 114 no longer qualifies as an attacking device 114. Additionally, if it is determined the detected TCP window advertisement value for the packets has exceeded the TCP window advertisement threshold value (step 206) than determining the data rate for the packets (step 210) is terminated until at least the detected window advertisement value for the packets is once again determined less than the TCP window advertisement threshold value (step 206).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for monitoring traffic in a network, the method comprising:

monitoring, by a network monitoring probe, data packets sent from an external device attempting to access one or more server devices in a protected network;

detecting a Transport Control Protocol (TCP) window advertisement value for each monitored data packet;

determining if a detected TCP window advertisement value for monitored packets sent from an external device is less than a TCP window advertisement threshold value wherein the TCP window advertisement threshold value for a packet data connection is determined by statistical analysis by monitoring the TCP window advertisement values during the packet data connection between an external device and a protected client;

determining if a data rate for the monitored packets sent to the one or more server devices is less than a data rate threshold value if the detected TCP window advertisement value is less than the TCP window advertisement threshold value;

determining the monitored packets sent from the external device to the one or more server devices in the protected network to be malicious if the detected window advertisement value is less than the TCP window advertisement threshold value and the determined data rate is less than the data rate threshold value.

2. The computer-implemented method of claim 1, wherein countermeasures are taken against data packets sent from the external device determined malicious packets.

3. The computer-implemented method of claim 2, wherein the countermeasures include sending a TCP Reset signal to the server device in the protected network that is targeted by the determined malicious packets to terminate a TCP connection to the external device sending the determined malicious packets.

4. The computer-implemented method of claim 2, wherein the countermeasures include blacklisting the external device sending the determined malicious packets for a predetermined time period.

5. The computer-implemented method of claim 1, wherein determining the packets to be malicious further includes determining an external device to be malicious if either the detected window advertisement value is less than the TCP window advertisement threshold value or the determined data rate is less than the data rate threshold value after at least a user configurable number of separate TCP connections to mitigate false positive determinations.

6. The computer-implemented method of claim 1, further including wherein after determining packets to be malicious, a determination is made if the detected TCP window advertisement value for the packets transmitted from the determined malicious external device has exceeded the TCP window advertisement threshold value.

7. The computer-implemented method of claim 6, wherein if it is determined the detected TCP window advertisement value for the packets has exceeded the TCP window advertisement threshold value than countermeasures applied to the packets transmitted from the determined malicious external device are removed.

8. The computer-implemented method of claim 6, wherein if it is determined the detected TCP window advertisement value for the packets has exceeded the TCP window advertisement threshold value than determining the data rate for the packets is terminated until at least the detected window advertisement value for the packets sent from an external device is once again determined less than the TCP window advertisement threshold value.

9. The computer-implemented method of claim 1, wherein the TCP window advertisement threshold value is a user configured static value.

10. The computer implemented method of claim 1, wherein the data rate is determined for the monitored packets contingent upon an amount of new data being acknowledged by TCP acknowledgement signals for the data packets sent from the external device.

11. A computer system for monitoring control traffic in a network, the computer system comprising one or more processors, one or more computer-readable storage devices, and a plurality of program instructions stored on at least one of the one or more storage devices for execution by at least one of the one or more processors, the plurality of program instructions comprising:
program instructions to, monitor by a network monitoring probe, data packets sent from an external device attempting to access one or more server devices in a protected network;
program instructions to, detect a Transport Control Protocol (TCP) window advertisement value for each monitored data packet;
program instructions to, determine if a detected TCP window advertisement value for monitored packets sent from an external device is less than a TCP window advertisement threshold value wherein the TCP window advertisement threshold value for a packet data connection is determined by statistical analysis by monitoring the TCP window advertisement values during the packet data connection between an external device and a protected client;
program instructions to, determine if a data rate for the monitored packets sent to the one or more server devices is less than a data rate threshold value if the detected TCP window advertisement value is less than the TCP window advertisement threshold value; and
program instructions to, determine the monitored packets sent from the external device to the one or more server devices in the protected network to be malicious if the detected window advertisement value is less than the TCP window advertisement threshold value and the determined data rate is less than the data rate threshold value.

12. The computer system recited in claim 11, wherein countermeasures are taken against data packets sent from the external device determined malicious packets.

13. The computer system as recited in claim 12, wherein the countermeasures include sending a TCP Reset signal to the server device in the protected network that is targeted by the determined malicious packets to terminate a TCP connection to the external device sending the determined malicious packets.

14. The computer system as recited claim 12, wherein the countermeasures include blacklisting the external device sending the determined malicious packets for a predetermined time period.

15. The computer system as recited in claim 11, wherein determining the packets to be malicious further includes determining an external device to be malicious if either the detected window advertisement value is less than the TCP window advertisement threshold value or the determined data rate is less than the data rate threshold value after at least a user configurable number of separate TCP connections to mitigate false positive determinations.

16. The computer system as recited in claim 11, further including wherein after determining packets to be malicious, a determination is made if the detected TCP window advertisement value for the packets transmitted from the determined malicious external device has exceeded the TCP window advertisement threshold value.

17. The computer system as recited in claim 16, wherein if it is determined the detected TCP window advertisement value for the packets has exceeded the TCP window advertisement threshold value than countermeasures applied to the packets transmitted from the determined malicious external device are removed.

18. The computer system as recited in claim 16, wherein if it is determined the detected TCP window advertisement value for the packets has exceeded the TCP window advertisement threshold value than determining the data rate for the packets is terminated until at least the detected window advertisement value for the packets sent from an external device is once again determined less than the TCP window advertisement threshold value.

* * * * *